US009214079B1

(12) United States Patent  
Alzahrani (10) Patent No.: US 9,214,079 B1
(45) Date of Patent: Dec. 15, 2015

(54) VEHICLE TASK REMINDER DEVICE (71) Applicant: Sultan Saad Alzahrani, Tempe, AZ (US)

(72) Inventor: Sultan Saad Alzahrani, Tempe, AZ (US)

( * ) Notice: Subject to any disclaimer, the term of this patent is extended or adjusted under 35 U.S.C. 154(b) by 5 days.

(21) Appl. No.: 14/299,642

(22) Filed: Jun. 9, 2014

(51) Int. Cl.
*G08G 1/123* (2006.01)
*B60Q 1/00* (2006.01)
*B60R 25/10* (2013.01)
*G01S 1/00* (2006.01)
*G08B 21/24* (2006.01)
*G08G 1/133* (2006.01)

(52) U.S. Cl.
CPC ............ *G08B 21/24* (2013.01); *G08G 1/133* (2013.01)

(58) Field of Classification Search
CPC ............ G08G 1/205; B60R 1/00; B60R 1/12; B60R 25/33; B60R 25/10; B60K 35/00; G01C 21/26; G01C 21/3461
USPC ............... 340/988, 995.17, 425.5, 426.19, 340/426.22; 701/400, 425
See application file for complete search history.

(56) References Cited

U.S. PATENT DOCUMENTS

| | | | |
|---|---|---|---|
| 6,411,891 B1* | 6/2002 | Jones | 701/465 |
| 7,817,033 B2* | 10/2010 | Motoyama | 340/539.32 |
| 8,385,944 B1* | 2/2013 | Nelissen | 455/456.3 |
| 2004/0193420 A1* | 9/2004 | Kennewick et al. | 704/257 |
| 2006/0058948 A1 | 3/2006 | Blass et al. | |
| 2008/0186226 A1 | 8/2008 | Ratnakar | |
| 2009/0239552 A1 | 9/2009 | Churchill et al. | |
| 2011/0130962 A1* | 6/2011 | Lindsey | 701/209 |
| 2012/0254763 A1* | 10/2012 | Protopapas et al. | 715/738 |
| 2015/0127493 A1* | 5/2015 | Winkelman et al. | 705/26.81 |

OTHER PUBLICATIONS

"Garmin® Next-Generation Infotainment System Turns Car Dashboard Into Digital Cockpit"; Garmin; Jan. 7, 2013; http://garmin.blogs.com/pr/2013/01/garmin-next-generation-infotainment-system-turns-car-dashboard-into-digital-cockpit.html.
Allyson Kazmucha; "OmniFocus vs. Todo vs. Things: Task management apps for iPhone shootout"; Aug. 3, 2012; http://www.imore.com/omnifocus-vs-todo-vs-things-task-management-apps-iphone-shootout.
Bakari Chavanu; "How to Set Up Location Alerts in iPhone Reminders"; Apr. 9, 2012; http://www.makeuseof.com/tag/set-location-alerts-iphone-reminders/.

* cited by examiner

*Primary Examiner* — George Bugg
*Assistant Examiner* — Munear Akki
(74) *Attorney, Agent, or Firm* — Oblon, McClelland, Maier & Neustadt, L.L.P.

(57) ABSTRACT

A vehicle task reminder device includes a clock, a GPS used indicate location and direction, and a memory used to store predetermined information. The device also includes an emitter used to activate an alarm signal, a processor having circuitry used to set a to do list, sync the to do list with the GPS and the clock, lock the car, cause the emitter to activate the alarm signal when a current time and location correspond to any task of the at least one to do list, check, when the alarm signal is activated, if a task is completed, and deactivate the alarm signal and update the at least one to do list. The processor also compares, upon the turn off of the car engine whether the current location corresponds to the predetermined home address, and asks to update the to do list if correspondence occurs and unlock the car.

19 Claims, 7 Drawing Sheets

| TASK # | TIME | LOCATION | REMINDER | STATUS |
|---|---|---|---|---|
| 1 | 11:00 AM | A | DOCTOR | PERFORMED |
| 2 | 11:30 AM | B | BANK | DELETED |
| 3 | 3:00 PM | C | GROCERY | POSTPONED |
| 4 | 4:00 PM | D | DRY CLEANER | PERFORMED |
| 5 | 5:00 PM | E | CAR WASH | PERFORMED EARLY |
| 6 | 5:30 PM | F | MEETING | WAITING |

… 
VEHICLE TASK REMINDER DEVICE

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicles are a major part in almost all people's lives. Whether it's a personal vehicle or a family vehicle or even a business vehicle they all play a vital role and people have become fully dependent on them. Vehicles are majorly used for transportation. However, a good number of trips per day can be saved if a user can remember everything they need at all times. Unfortunately, human nature makes it inevitable that one will often forget something.

Generally, most people use their vehicles to buy groceries for example; providing a reminder in the vehicle, will help them to perform all tasks in one trip. This is not only convenient but also can save a lot of trouble, money and gas. If a user happens to be an elderly person or someone with disabilities, making multiple trips a day is a hassle.

SUMMARY

A vehicle task reminder device includes a clock, a GPS used indicate location and direction, and a memory used to store predetermined information. The device also includes an emitter used to activate an alarm signal, a processor having circuitry used to set a to do list, sync the to do list with the GPS and the clock, lock the car, cause the emitter to activate the alarm signal when a current time and location correspond to any task of the at least one to do list, check, when the alarm signal is activated, if a task is completed, and deactivate the alarm signal and update the at least one to do list. The processor also compares, upon the turn off of the car engine whether the current location corresponds to the predetermined home address, and asks to update the to do list if correspondence occurs and unlock the car.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

Figure 1:
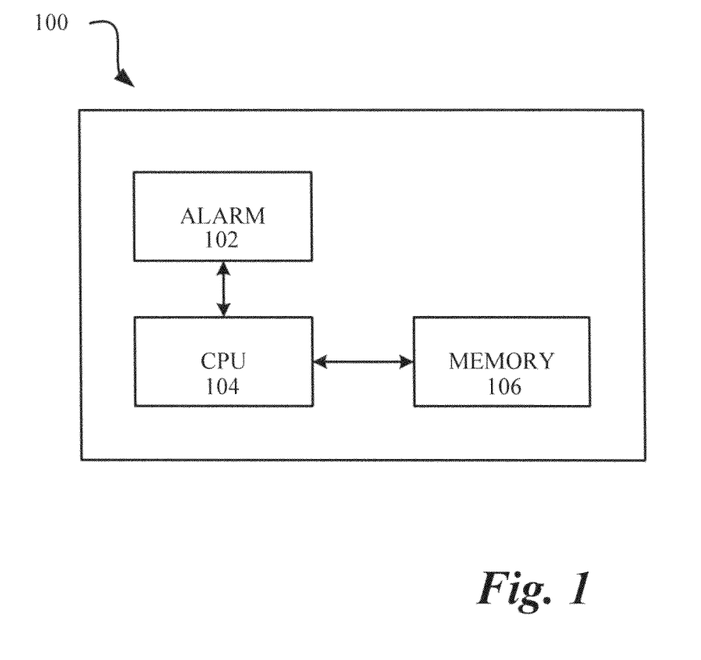
FIG. 1 is a system diagram illustrating the vehicle task reminder device and the relationship between setting a to do list, processing through a CPU and updating memory in the vehicle task reminder device according to one example.

FIG. 1 is a block diagram illustrating the general process of the vehicle task reminder device and/or system 100 according to one example. When an alarm 102 signal is activated, a CPU 104 carries out instructions by extracting instructions and information from the memory 106 and performs predetermined operations of the vehicle task reminder device.

Figure 2:
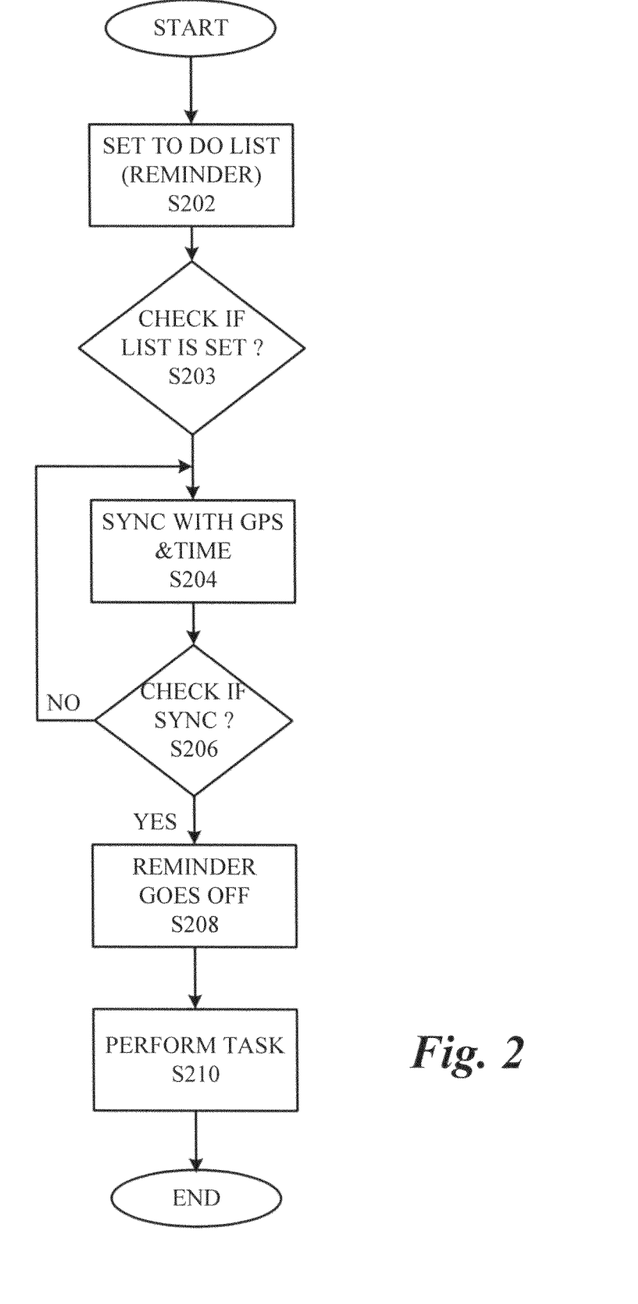
FIG. 2 is a flowchart illustrating a process of setting and resetting a vehicle to do list reminder according to one example.

FIG. 2 is a flowchart illustrating a process of setting and resetting a vehicle to do list according to one example. The process starts at step S202 which is a waiting state where the vehicle task reminder device waits for a to do list to be set. At step S203 the device checks if a to do list was set, if a to do list of the vehicle task reminder device has not been set, the device continues to check at step S203 until a to do list has been set. In selected embodiments, the to do list may be set via manual input, voice input or remotely via an external connection as will be described in FIG. 4. The to do list can be saved in the memory and in selected embodiments the to do list is only saved in response to the vehicle being locked. Further, as described below, the to do list may be linked with the vehicle GPS and clock in order to monitor tasks on the to do list. Thus, in selected embodiments, the to do list will only be synchronized with the GPS and vehicle clock in response to the vehicle being locked. Once a to do list has been set the process proceeds to step S204 where the system synchronizes the to do list with the vehicle's GPS and time. At step S206 the system checks if the synchronization was done. If the synchronization has not been done, the system continues to go back to step S204 until synchronization is done.

Once the synchronization is done the process proceeds to step S208 where the reminder (to do list) goes off and an alarm signal is generated. In selected embodiments the alarm signal can be a sound, a vibration, a light, a text message or other alarm signals. Accordingly, it is assumed at this point that a specific to do list has been set and synchronized and that the time and/or locations has been reached at which something on the to do list was set such that an alarm signal is generated by the vehicle task reminder device. For example, a reminder from the to do list may generate an alarm at a certain time or if there is a reminder for picking up groceries on the to do list and the car is passing either a pre-determined grocery store or any grocery store (corresponding location in that geographical area) based on GPS location tracking, an alarm may be sent. Then at step S210 the vehicle task reminder device performs a predetermined task via a CPU 104 illustrated in FIGS. 1 and 5.

Figure 3A:
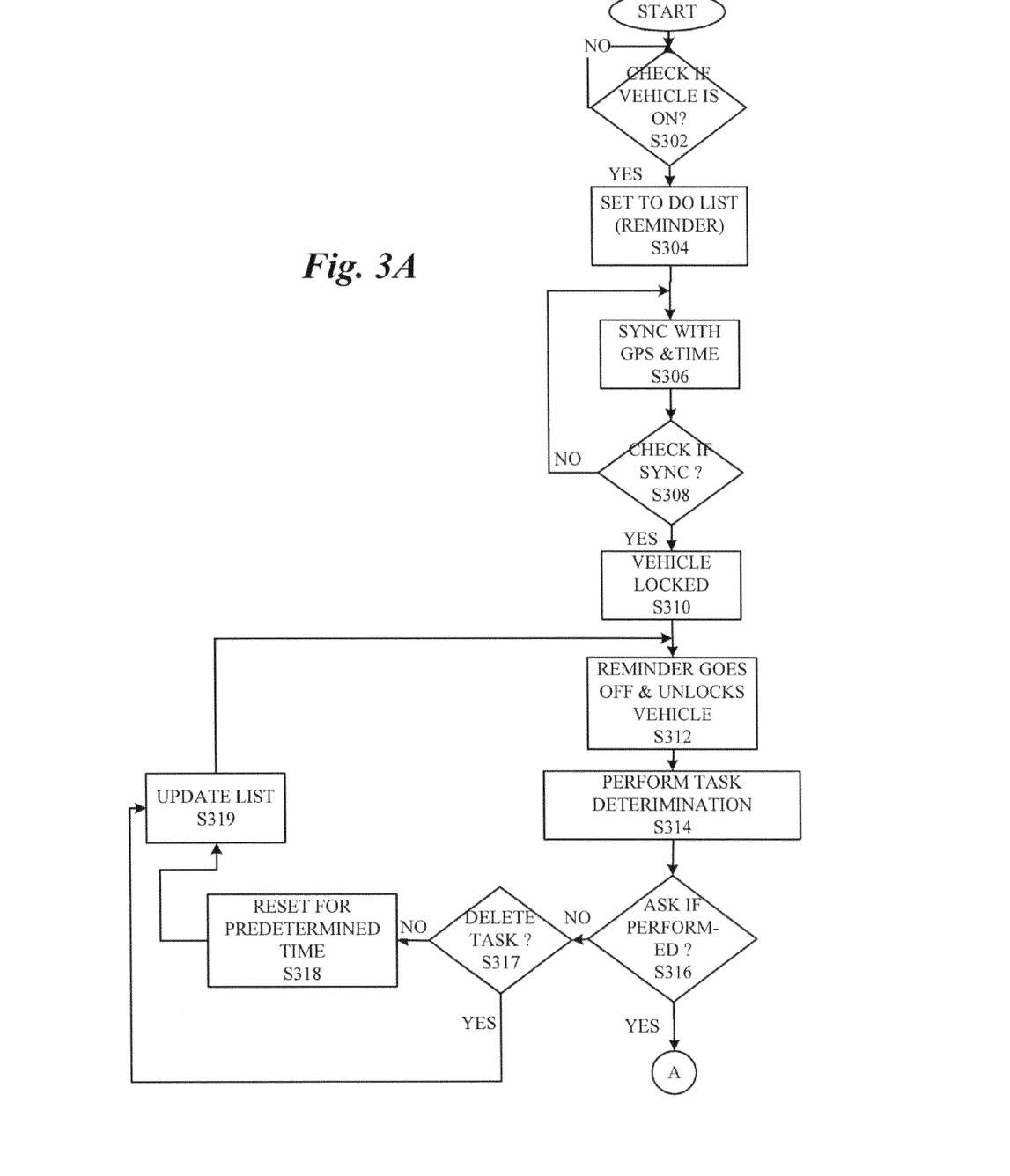
FIGS. 3A and 3B are flowcharts illustrating a process of using the vehicle task reminder with vehicle lock features according to one example.
Figure 3B:
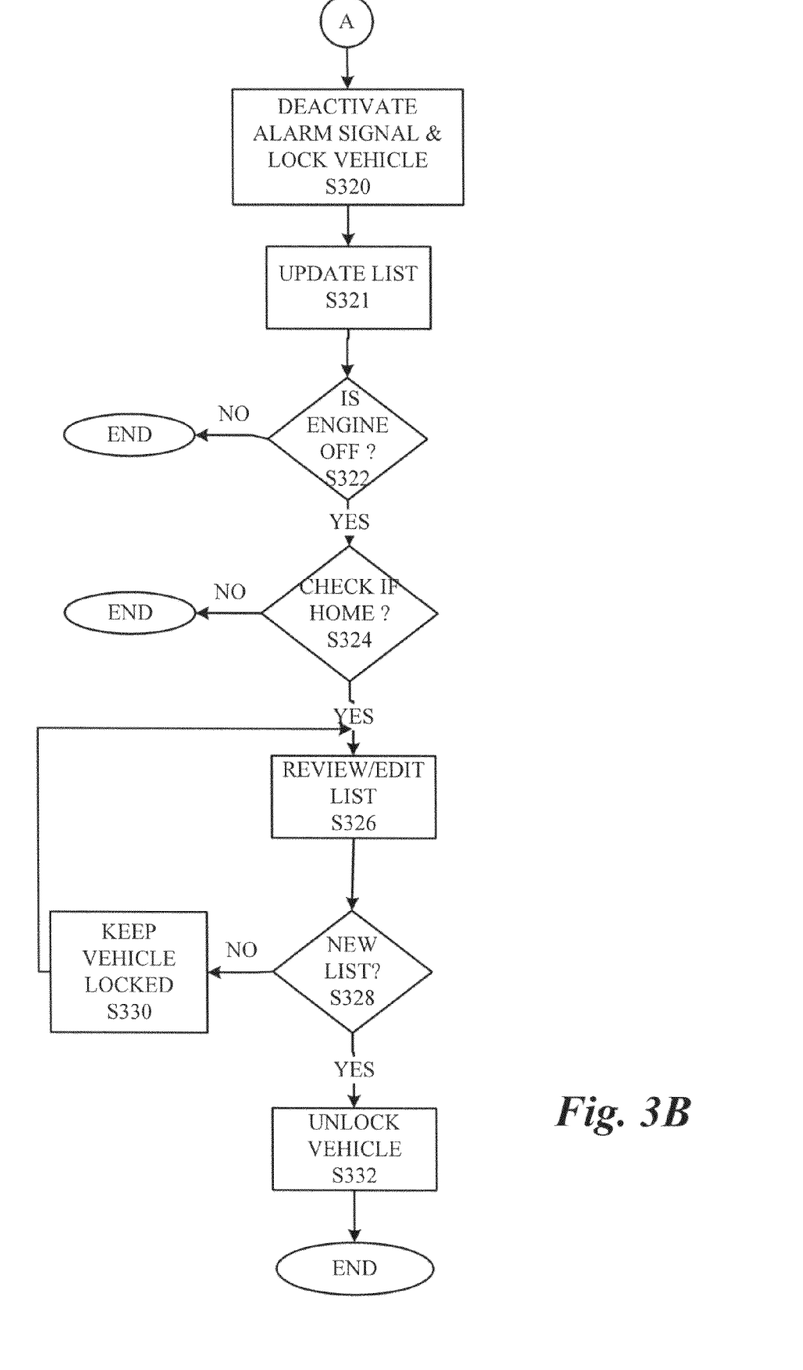

FIGS. 3a and 3b are flowcharts illustrating a process of using the vehicle task reminder with vehicle lock features according to one example. The process begins at step S302 which is a verification state where the vehicle task reminder device verifies that the vehicle is turned on. If the vehicle is not turned on, the system continues to check at step S302 until the vehicle is turned on. Once the vehicle is turned on the system proceeds to step S304 where the system waits for a to do list to be set or received, then at step S306 the system synchronizes the to do list with the vehicle's GPS and time. For example, the to do list may be generated by the user in the car at any time or may be received remotely from a stored location based on a previously inputted list. At step S308 the system checks if the synchronization was done. If the synchronization has not been done, the system continues to go back to step S306 until synchronization is done.

Once the synchronization is done the process proceeds to step S310 where it is assumed that the vehicle is locked. In selected embodiments, the locking of the doors of the vehicle can be accomplished manually by the user, automatically based on the ignition of the engine and/or automatically based on the vehicle reaching a certain speed. Further, the lock of the vehicle is not limited to the doors and could apply to locking the steering wheel, locking dashboard displays and/or functionality included within the car such as radio control, environment control, and seat controls.

At step S312 the vehicle unlocks and the to do list (reminder) goes off and an alarm signal is generated. Accordingly, it is assumed at this point that a specific to do list has been set and synchronized and that the time and/or location has been reached at which the to do list was set such that an alarm signal is generated by the vehicle task reminder device. Then the system performs via the CPU 104 a predetermined task determination at step S314. In selected embodiments the predetermined task can be one or all of the following tasks on the to do list: go to the bank, get clothes from the dry cleaner, buy groceries and/or any other task. When at a certain location and/or time that correspond to this task according to a specific to do list that has been set and synchronized. However, other tasks are contemplated and the system is not limited to the tasks mentioned herein. For example, the to do list may include a reminder to go to the bank at 10:00. Therefore, the alarm may be activated at 10:00 AM as a reminder to go to the bank or may be activated at a slightly earlier time. At this point, a GPS system in the vehicle may automatically be updated to show one or more routes to the bank. The vehicle task reminder device may also based on the GPS route determine if the vehicle can make it in time to the bank and if this is not possible the vehicle task reminder device may offer to automatically connect the driver to the bank via wireless communication as would be understood by one of ordinary skill in the art. Accordingly, the system may find contact info or use pre-existing contact info to automatically contact people based on the status of the to do list, a time, a location, and/or routing information provided by the GPS system. The system may also automatically check other items on the to do list that may be affected by being late or behind on one item and may offer to adjust these settings automatically or can additionally put the driver in contact with any parties relating to the to do list tasks that may have to be shifted.

Then at step S316, the system checks if the task was performed. If the task was not performed, the system proceeds to step S317 where the system asks to delete the task, if the task was deleted the system proceeds to step S319 where the system updates the to do list and returns to step S312. However, if the task was not deleted then the system proceeds to step S318 where the system resets the to do list (reminder) for a predetermined time, deactivates the alarm signal, and goes back to step S312. However, if the task was performed the system proceeds to steps S320 of FIG. 3B where the system locks the vehicle again and deactivates the alarm signal. Once the alarm signal is deactivated the system proceeds to step S321 where it updates the to do list by marking the performed task as "performed" as later shown in FIG. 5.

Step S322 is a verification state where the system checks if the vehicle is turned off. If the vehicle is on, the system continues to function as described in steps S302 through S320 until the vehicle is turned off Once the vehicle is turned off, the system proceeds to step S324, where the system checks the location of the vehicle and compares it to a predetermined home address saved in memory 602 illustrated in FIG. 6. If the two addresses do not correspond, the system continues to function as described in steps S302 through S324 until they do. Once the system determines that the vehicle is home the system proceeds to step S326, where the user is asked to review and update the to do list. In selected embodiments, reviewing and updating the to do list can include postposing some of the already existing unperformed tasks, adding new tasks, deleting some the already existing unperformed tasks, changing the alarm signal, changing the predetermined home address, adjusting the clock of the vehicle and any other adjustments. At step S328, the system checks whether or not the list was updated. If the list was not updated the system keeps the vehicle locked at step S330 and goes back to step S326 until the list is updated. Once the list is updated, the system proceeds to step S332 where the vehicle is unlocked.

In another embodiment, the system proceeds to step S324, directly from step S320 where the system skips step S322 of checking if the vehicle's engine is on or not and proceeds to checking the location of the vehicle and comparing it to a predetermined home address saved in memory 602, the process then proceeds as previously explained in FIGS. 3A and 3B, but the vehicle's engine can only be turned off along with the unlocking of the vehicle at step S332, if the to do list is updated.

The updating of the to do list may also include indicating that all the tasks have been performed or that the user is no longer requiring those tasks to be performed. For example, once the user gets within a predetermined distance of their home and/or turns off the engine, the system may check whether all of the tasks have been completed. The system will not allow the doors to be unlocked until the user updates the list and provides a confirmation that all tasks are completed to the user's satisfaction. If system identifies that the tasks are already completed, the system may automatically allow the doors to unlock. The system may indicate that a task is completed if the user comes within a predetermined distance of the task location for a predetermined period of time and/or at a predetermined time. For example, if the task is for the user to go to the bank, the system may determine that the user completed this task if the user is within 0.5 miles of the bank for at least 15 minutes. The system could determine this based on GPS location tracking. Further, if the task in the to do list had an additional limitation that the user needed to go to the bank at 10:00 AM then the system may determine that the task is completed only if the vehicle is within a predetermined distance of the bank for a predetermined period of time and also within a predetermine window (i.e. 15 minutes) of the task time of 10:00 AM.

In selected embodiments, the system may also detect when the vehicle is in park and prevent a user from shutting the engine off or turning the engine on until the to do list is updated as described above. Accordingly, the system may detect that the user is within a predetermined distance of a task in the to do list and will not let the user start the car to leave that location until the user indicates that the task has been completed. Accordingly, in selected embodiments, an additional backup battery may be part of the system to ensure that the system can run even when the vehicle is not turned on.

Figure 4:
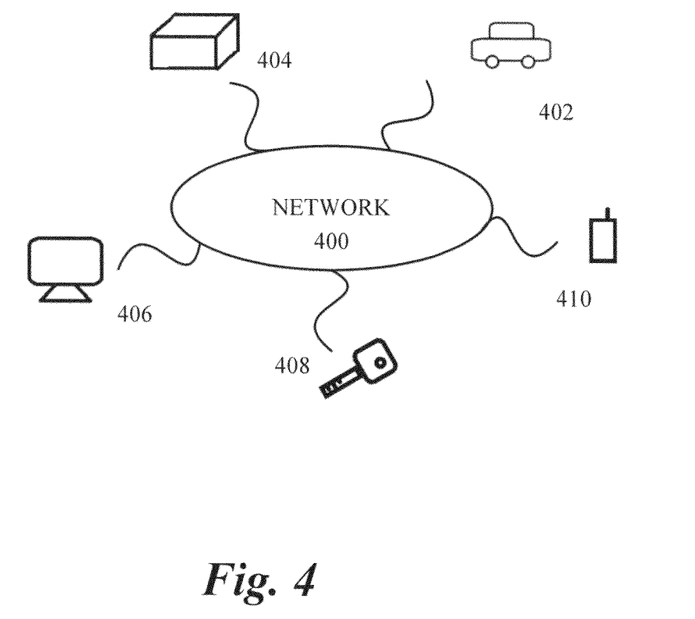
FIG. 4 illustrates a network connecting various input means to the vehicle task reminder device according to one example.

FIG. 4 illustrates a network 400 connecting various input means to the vehicle task reminder device. The to do list may be set via manual input from the vehicle 402, or remotely via an external connection such as a server 404, a personal computer 406, the automated keys of the vehicle 408 or via a personal smart phone 410. Accordingly, in selected embodiments there may be additional automated keys used when the user is not in the vehicle. The system includes a tracking device 401 that can track the automated keys of the vehicle. This feature widens the vehicle's GPS diameter, meaning when a user is not in the vehicle and is at a task corresponding location, the system continues to track the keys (which will be with the user), this will allow the system to cover a larger geographic area increasing the chances of detecting the predetermined location or any location corresponding to other tasks on the to do list. When a new location of the keys is detected and is corresponding to another task on the to do list, the system activates an alarm signal through the automated keys. In selected embodiments the alarm signal can be a sound, a vibration, a light, a text message or other alarm signals. For example, if two tasks on the to do list were: doctor's appointment at location A and groceries at location B, where locations A and B are close to each other but cannot be detected by the vehicle's GPS at the same time, due to the distance between them being more than the GPS's detection diameter, then when the user exits the vehicle at location A and walks with the vehicle's keys further than where the vehicle is parked, the system continues to track the keys using predetermined information that were uploaded onto the server 404 and downloaded by the system when the vehicle was turned on. This provides a new GPS diameter, in which case predetermined location B or a location corresponding to task #2 will be detected and an alarm signal will go off through the vehicle's keys to alert them about the task corresponding to that location which in this case is groceries.

This feature is very useful and will help the user remember an additional task that might have not been in the vehicle's GPS diameter as well as the ability to perform multiple tasks at a time if possible/available. The variety of input possibilities is really important as the problem this device is trying to tackle is forgetting, this will allow the user to update the list at any time and almost any location, in addition to providing the convenience of accessing the to do list via multiple means in case the user had forgotten their smart phone at home, or their personal computer is broken for example.

Figure 5:
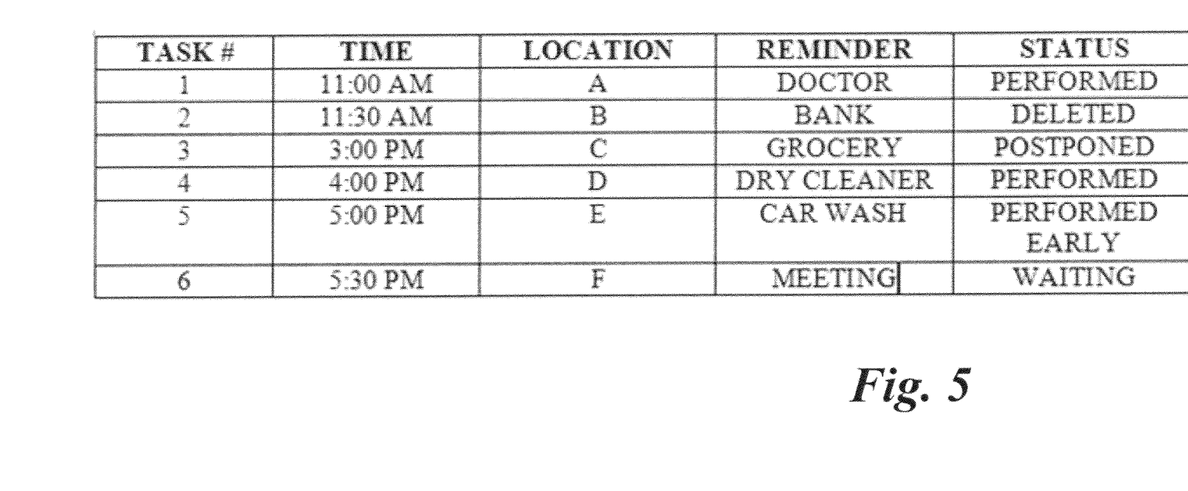
FIG. 5 illustrates an exemplary to do list displaying different scenarios according to one example.

FIG. 5 illustrates an exemplary to do list displaying different scenarios according to one example. In this embodiment, the user has set a to do list containing 6 different tasks with 6 different corresponding times and locations. Once the user has set the to do list, the system will synchronize the list with the vehicle's GPS and time at step S306 and lock the vehicle at step S310. Assuming that a current time corresponds to the time corresponding to task #2, which in this case is 11:30 am, the system activates an alarm signal and unlocks the vehicle at step S312. Once an alarm signal is activated, the user is expected to perform the corresponding task, if the user decides not to, as it is the case in this example, the system asks the user to delete the task from the to do list at step S317. If the task is deleted, then the to do list is updated at step S318 and the task will show as "deleted" on the to do list as shown in this example.

When the process of the system proceeds normally and a task is performed, following the process previously described in FIG. 3, then the to do list is updated and the task will show as "performed" on the to do list. For example, task #1 on this exemplary to do list was performed when it's time and/or location corresponded to a current location and/or time and the to do list was updated to show that at step S321.

In another example, the system might detect the location and/or time of a task, such as task #3 and activate an alarm signal. However, the user might decide that they don't have enough time to perform the task, in which case the system still allows them to reset the reminder for the task for a predetermined time at step S318, and updates the to do list at step S319 to show as "postponed" as shown for task #3 in FIG. 5.

Tasks #4 and 5 in FIG. 5 show as "performed" and "performed early" respectively. The system will mark a task "performed early" when it is performed before its corresponding time, which is in this case 5:00 pm. Accordingly, when the vehicle is at location D as shown in FIG. 5 (corresponding location with task #4), the system will activate an alarm signal. Once an alarm signal is activated the user will perform the task, which in this case is dry cleaner, this will require the user to exit the vehicle. Once the user exits the vehicle, the system continues to track the vehicle's automated keys as was previously described in FIG. 4. This will allow the system to start detecting locations at a larger diameter than that of the vehicle's. In this example, the system was able to detect location E, which corresponds to task #5 and an alarm signal was activated through the vehicle's automated keys. In response to the activation of the alarm signal through the keys, the user performed task #5 before its corresponding time that was initially inputted into the to do list, thus the system updates the to do list for task #5 to show "performed early" as shown in FIG. 5.

Moreover, if a task is inputted into the to do list, and the current time and/or location of the vehicle does not correspond to any of its inputted information (time and location), then the system will continue to show it as "waiting" in the to do list, as is the case for task #6 in FIG. 5. Further, as noted above, the system may identify that a task has been performed via the vehicle GPS or keys when a user is at a particular location relating to the task for a predetermined period of time and/or at a time identified with the task in the to do list.

In another embodiment of the vehicle task reminder device, the user might want to add a task to the to do list while the user is on the road. In this case the device will automatically determine the best location and route according to what fits the current to do list best and provides the shortest total travel distance. For example, if the user remembers that he needs to exchange money after finishing task 1 in FIG. 5; then the user will input the task into the to do list without providing any time or location details. In this case, the vehicle task reminder will determine the best money exchange location based on the current location, even if that meant choosing a location that is different from the one used regularly/saved in memory corresponding to this task (if available). If the GPS finds multiple money exchange locations that are within the same distance from the current location, the choice is left for the user. Once the user chooses a suitable location, the device will provide the user with all possible route options (3 in this case), while recommending only one of them based on the shortest total distance. According to the current example, the options would be:

Option one: perform task 2, money exchange and then task 3.
Option two: perform task 2, task 3 and then money exchange.
Option three: perform money exchange, task 2 and then task 3.

In this case, the vehicle task reminder device recommended the third option. However, the user can still choose any of the options nevertheless.

Accordingly, if the user remembers that he needs to exchange money after finishing task 1 in FIG. 5, yet this task can be of any priority; then the user will input the task into the to do list and set it's priority without providing any time or location details. If it were of a high priority then the system will assign it to the beginning of the list and provide the user with all possible route options. However, if it was of a low priority, then the system will assign it towards the end of the to do list or even at the very end of the to do list and still provide the user with all possible route options. The system will manipulate the added task according to it's as well as other tasks priorities, times, and locations providing the user with the shortest total travel distance and the most convenient and efficient task performance.

The system provides numerous advantages. The user will be continuously reminded to perform certain tasks and can get through the day without forgetting to do things. The system can automatically determine when tasks are performed and therefore manual intervention by the user is not required as often and is therefore less burdensome on the user. Additionally, the system can coordinate contacting various parties based on whether a task is performed or not such that the user can update the to do list as well as related parties as to his status on performing the tasks. This alleviates additional burdens on the user of having to readjust the schedule and contact people manually. Furthermore, the system allows the user to add and perform tasks on the fly, saving them the effort and energy of thinking about the best and most efficient routes and assuring the user an immediate well organized schedule.

Next, a hardware description describing the vehicle task reminder device according to exemplary embodiments is described with reference to FIG. 6.

Figure 6:
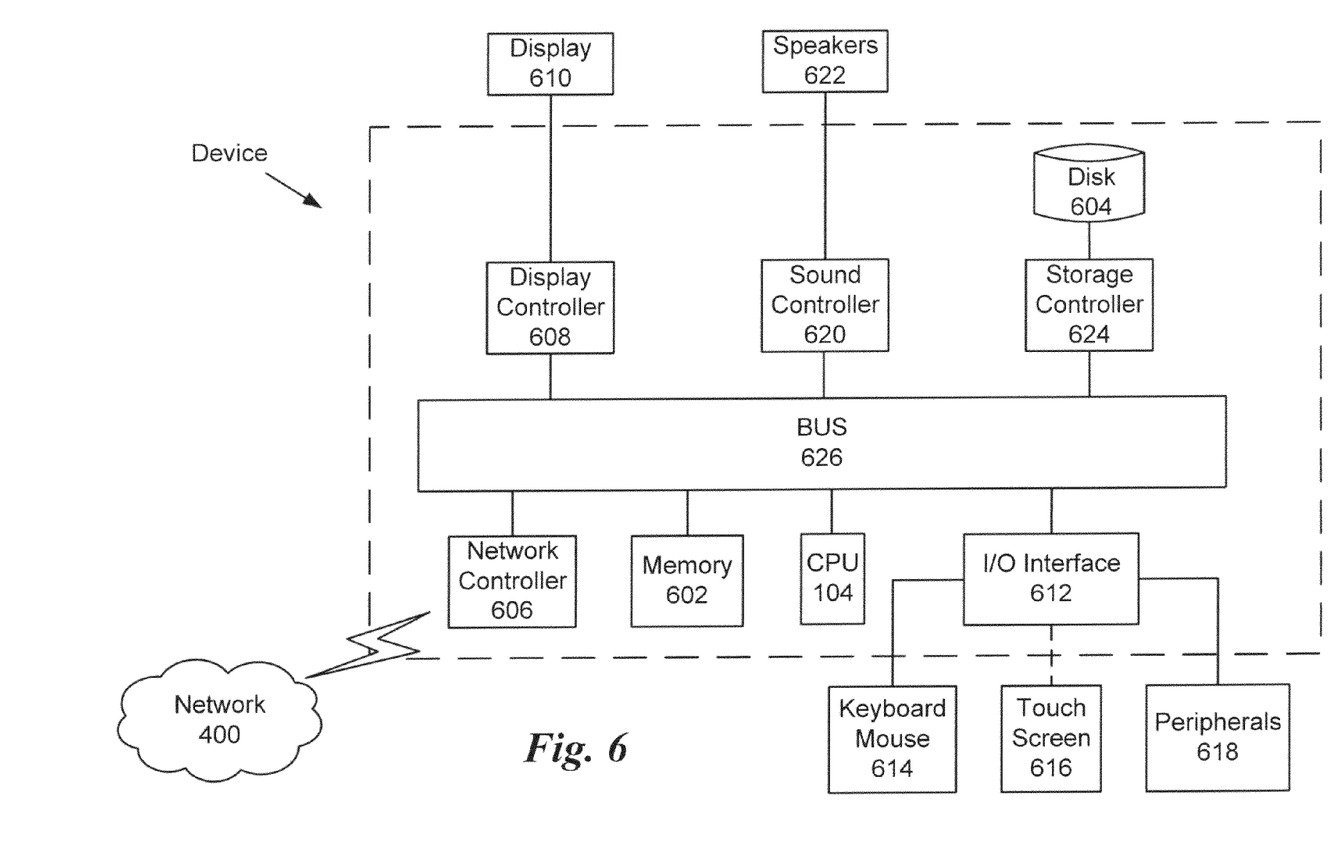
FIG. 6 illustrates an exemplary hardware configuration of the vehicle task reminder device according to one example.

In FIG. 6, the vehicle task reminder device includes a CPU 104 which performs the processes described above. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as another server or computer.

Further, the above-noted processes may be provided as a utility application, background daemon, or component of an operating, or combination thereof, executing in conjunction with CPU 104 and an operating such as Microsoft Windows 8, UNIX, Solaris, LINUX, Apple MAC-OS and other systems known to those skilled in the art.

CPU 104 may be a Xenon or Core processor from Intel of America or an Opteron processor from AMD of America, or may be other processor types that would be recognized by one of ordinary skill in the art. Alternatively, the CPU 104 may be implemented on an FPGA, ASIC, PLD or using discrete logic circuits, as one of ordinary skill in the art would recognize. Further, CPU 104 may be implemented as multiple processors cooperatively working in parallel to perform the instructions of the inventive processes described above.

The vehicle task reminder device in FIG. 6 also includes a network controller 606, such as an Intel Ethernet PRO network interface card from Intel Corporation of America, for interfacing with network 400. As can be appreciated, the network 400 can be a public network, such as the Internet, or a private network such as an LAN or WAN network, or any combination thereof and can also include PSTN or ISDN sub-networks. The network 400 can also be wired, such as an Ethernet network, or can be wireless such as a cellular network including EDGE, 3G and 4G wireless cellular systems. The wireless network can also be WiFi, Bluetooth, or any other wireless form of communication that is known.

The vehicle task reminder device further includes a display controller 608, such as a NVIDIA GeForce GTX or Quadro graphics adaptor from NVIDIA Corporation of America for interfacing with display 610, such as a Hewlett Packard HPL2446w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard A sound controller 620 is also provided in the vehicle task reminder device, such as Sound Blaster X-Fi Titanium from Creative, to interface with emitter 622 thereby providing sounds, vibrations, electric shock light and/or music. The emitter 622 can also be used to accept dictated words as commands for controlling the vehicle task reminder system server 404.

The general purpose storage controller 624 connects the storage medium disk 604 with communication bus 626, which may be an ISA, EISA, VESA, PCI, or similar, for interconnecting all of the components of the vehicle task reminder system server 404. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present invention are possible in light of the above teachings. It is therefore to be understood that within the scope of the appended claims, the invention may be practiced otherwise than as specifically described herein. Peripheral Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A device for use in a vehicle comprising:
   a clock configured to indicate time;
   a GPS configured to indicate location and directions;
   a memory configured to store at least one to do list, a predetermined address as home address, an alarm period as a predetermined alarm period;
   an emitter configured to activate an alarm signal;
   a processor programmed to
   set a to do list having a plurality of tasks, time and geographic locations corresponding to each task,
   sync the to do list with the GPS and the clock,
   lock the vehicle,
   cause the emitter to activate the alarm signal when a current time and location correspond to any task of the at least one to do list,
   check, after the alarm signal is activated, if a task is performed,
   deactivate the alarm signal and update the at least one to do list if that task is completed, and
   deactivate the alarm signal and reset the time of the alarm signal to the predetermined alarm period if that task is not performed,
   compare, in response to the vehicle engine being turned off, a current location of the vehicle to the predetermined home address, and send a request to a display asking a user to update the to do list, when the current location corresponds to the predetermined home address,
   unlock, when every task on the to do list is performed or the to do list is updated, the vehicle,
   wherein upon a determination by the GPS that the vehicle is within a predetermined distance of the home address, the processor only allows the vehicle to be unlocked after every task on the to do list has been performed or the to do list is updated.

2. The device according to claim 1, wherein the vehicle is a car.

3. The device according to claim 1, wherein the to do list may be inputted manually and/or remotely.

4. The device according to claim 3, wherein the remote input of the to do list may be done through at least one of a server, a smart phone, vehicle's automated keys and a personal computer.

5. The device according to claim 1, wherein the vehicle is locked in response to the to do list being saved in memory and synchronized with GPS and time.

6. The device according to claim 1, wherein the to do list is only saved and synchronized with GPS and time in response to the vehicle being locked.

7. The device according to claim 1, wherein the processor only allows the engine of the vehicle to be activated or deactivated after every task on the to do list has been performed or the to do list is updated.

8. The device according to claim 1, wherein the processor is further programmed to check, when the alarm signal is activated, if a task is not completed, and deactivate the alarm signal and reset for the predetermined alarm period.

9. The device according to claim 4, further comprising:
   a tracking device located in the vehicle configured to track automated keys of the vehicle,
   an emitter located in the vehicle's automated keys configured to emit a reminder signal,
   wherein the processor is further programmed to send a signal to activate the emitter located in the vehicle's automated keys to emit, in response to the system GPS detection of a new location of the vehicle's automated keys when the user is not in the vehicle, a reminder signal, when the detected GPS location of the vehicle's automated keys corresponds to a geographic location in the to do list.

10. The device according to claim 1, wherein the processor determines that a task on the to do list is performed when the location of the vehicle determined by the GPS corresponds to a geographic location in the do list corresponding to the task.

11. The device according to claim 10, wherein the processor determines that a task on the to do list is performed when the location of the vehicle determined by the GPS corresponds to a geographic location in the do list corresponding to the task and is located at the geographic location for a predetermined period of time.

12. A method of operating a device that indicates reminders from a vehicle, comprising:
    storing, in a memory, at least one to do list,
    an address as a predetermined home address, and an alarm period as a predetermined alarm period;
    setting a to do list having a plurality of tasks, time and geographic locations corresponding to each task;
    synchronizing the to do list with the GPS and the clock;
    locking the vehicle;
    activating, via an emitter, an alarm signal when a current time of the clock and/or location of the GPS correspond to any task of the at least one to do list;
    checking, via a processor, when the alarm signal is activated, if the task is performed, and deactivating, via the processor, the alarm signal and updating the at least one to do list;
    deactivating the alarm signal and updating the to do list for the at least one pre-determined alarm period if the task is not performed;
    comparing, via the processor, when the vehicle engine is turned off and in response the deactivation of the device, the current location to the predetermined home address, and asking a user to update the to do list, when the current location corresponds to the predetermined home address;
    unlocking the vehicle in response to every task on the to do list being updated.

13. A non-transitory computer-readable medium including executable instructions, which when executed by a computer, cause the computer to perform a method of operating a device that indicates reminders from a vehicle, the method comprising:
    storing at least one to do list,
    an address as a predetermined home address, an alarm period as a predetermined alarm period;
    setting a to do list having a plurality of tasks, time and geographic locations corresponding to each task;
    synchronizing the to do list with the GPS and the clock;
    locking the vehicle;
    activating, via an emitter, the alarm signal when a current time of the clock and location of the GPS correspond to the at least one to do list;
    checking when the alarm signal is activated, if the task is performed, and deactivating, via the processor, the alarm signal and updating the at least one to do list;
    deactivating the alarm signal and updating the to do list for the at least one pre-determined alarm period if the task is not performed;
    comparing when the vehicle engine is turned off and in response the deactivation of the device, the current location to the predetermined home address, and asking a user to update the to do list, when the current location corresponds to the predetermined home address;

unlocking the vehicle in response to every task on the to do list being updated.

14. The method according to claim 12, wherein the to do list may be inputted manually and/or remotely.

15. The method according to claim 12, wherein the processor causes the vehicle to be locked in response to the to do list being saved in memory and synchronized with GPS and time.

16. The method according to claim 12, wherein the to do list is only saved and synchronized with GPS and time after the vehicle is locked.

17. The method according to claim 12, wherein, in response to the GPS determining that the vehicle is within a predetermined distance of the home address, processor only unlocks the vehicle after the to do list is updated.

18. The method according to claim 12, wherein the processor is further programmed to check, when the alarm signal is activated, if a task is not completed, and deactivate the alarm signal and reset for the predetermined alarm period.

19. The method according to claim 12, further comprising:
   emitting, via an emitter located in car keys, a reminder signal,
   activating, via a processor, the emitter to emit, in response to the GPS detection of a new location when the user is not in the vehicle, a reminder signal.

* * * * *